UNITED STATES PATENT OFFICE.

EVERED W. ANDERSON, OF BALTIMORE, MARYLAND, ASSIGNOR OF ONE-HALF TO CHARLES W. WEBB, OF BALTIMORE, MARYLAND.

ARTIFICIAL-STONE COMPOSITION.

No. 927,312.     Specification of Letters Patent.     Patented July 6, 1909.

Application filed January 30, 1908. Serial No. 413,491.

*To all whom it may concern:*

Be it known that I, EVERED W. ANDERSON, a citizen of the United States, residing at Baltimore, in the State of Maryland, have invented certain new and useful Improvements in Artificial-Stone Compositions, of which the following is a specification.

My invention comprises a composition of matter for the manufacture of artificial stone.

In carrying out my invention I crush a suitable quantity of granite, marble or other stone to a fine condition so that its particles will be, in size, about like that of granulated sugar. I mix this in a dry state, with an equal quantity of cement and small percentages of pulverized soapstone and lime putty, that is slaked lime which, in solution, has been passed through a cloth so as to remove the gritty parts. Small portions of bicarbonate of soda and alum, are dissolved in water and this solution is then mixed with the before mentioned ingredients, the quantity of water used being sufficient to make the mass of the consistency of soft putty. This plastic material is then placed in suitable molds and allowed to harden. The proportions of ingredients which I prefer to use are, by measurement, granulated stone forty-three parts, cement forty-three parts, pulverized soapstone five parts, slaked lime (lime putty) five parts, bicarbonate of soda three parts and alum one part. After this mass, mixed in the manner before described, has been in the mold for about forty-eight hours, and before it has fully set or hardened, it will take a good polish and the polishing operation is preferably performed at this stage because it requires less labor than after the stone has become harder. It may, however, be polished after it has fully hardened. The proportions of ingredients may be varied somewhat but for the best results I prefer the proportions stated. In some cases I may omit the soapstone and lime, although the addition of these ingredients gives a more desirable result.

The cement and granulated stone form the basis of the composition; the lime renders the mixture more pliable for the purpose of molding than it otherwise would be; the bicarbonate of soda in conjunction with the alum greatly increases the density and hardness of the finished stone, and the soapstone is used for the purpose of giving luster to the finished stone.

What I claim is,—

1. An artificial stone composition comprising granulated stone, cement, pulverized soapstone, lime, bicarbonate of soda and alum.

2. An artificial stone composition comprising granulated stone forty-three parts, cement forty-three parts, pulverized soapstone five parts, lime five parts, bicarbonate of soda three parts and alum one part.

3. An artificial stone composition comprising granulated stone and cement in approximately equal proportions, with small percentages of lime, soapstone, bicarbonate of soda and alum.

4. An artificial stone composition comprising a mixture of cement and finely crushed stone, with small percentages of bicarbonate of soda and alum.

In testimony whereof I affix my signature, in presence of two witnesses.

EVERED W. ANDERSON.

Witnesses:
    LOUISE FRINK,
    JNO. WATSON, Jr.